Oct. 10, 1933.   H. L. ROGERS   1,929,756
FRONT END LIFT AND SUPPORT FOR SEMITRAILER VEHICLES
Filed June 20, 1932   3 Sheets-Sheet 1
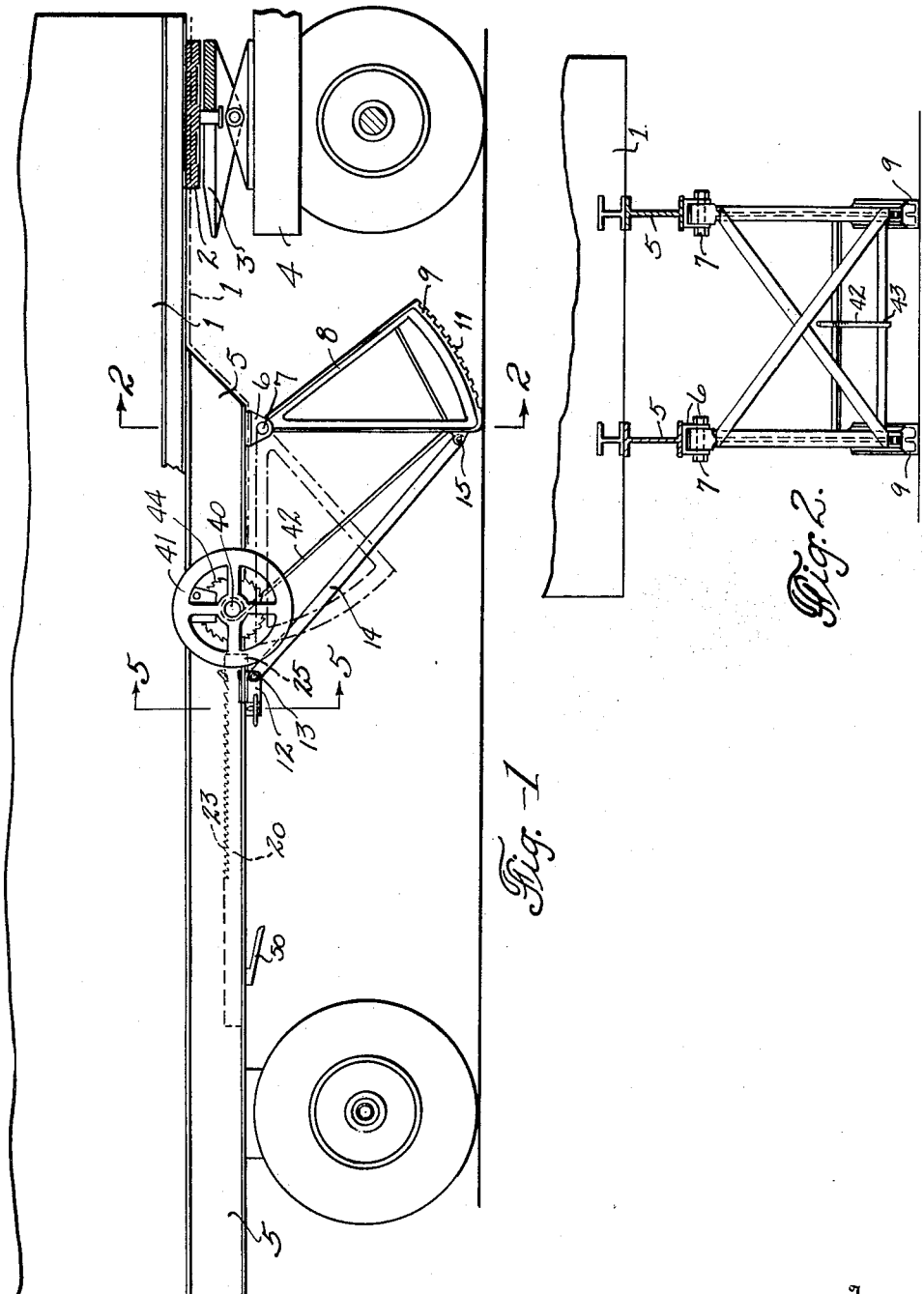
Inventor
Hugh L. Rogers,
By Soule & Leonard,
Attorneys

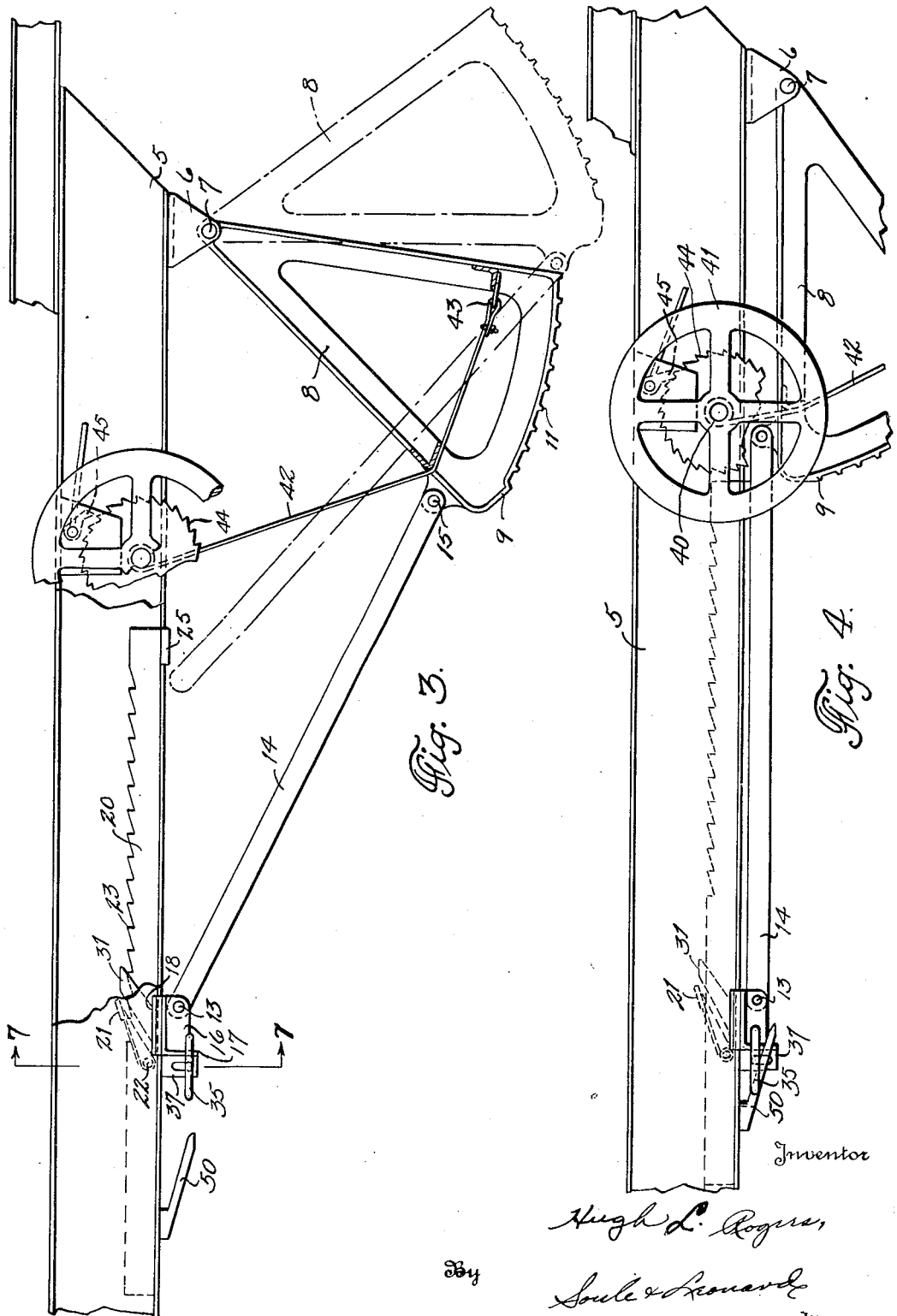

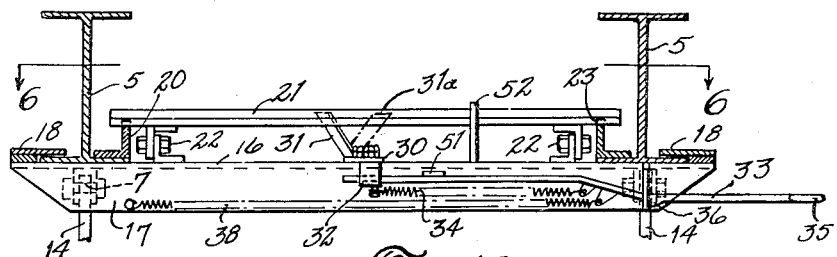
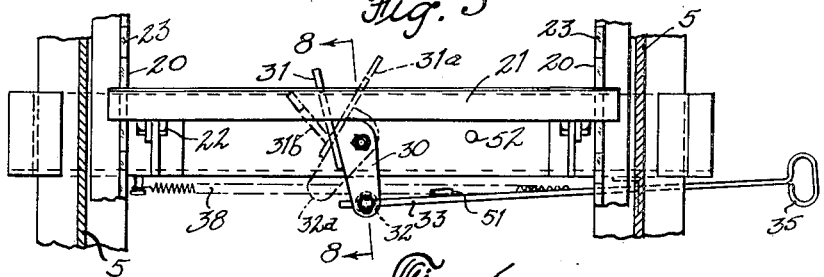
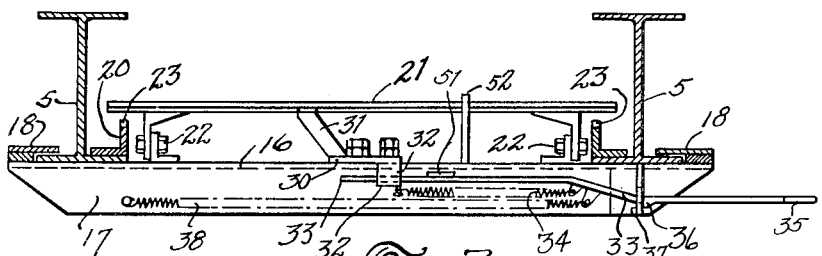
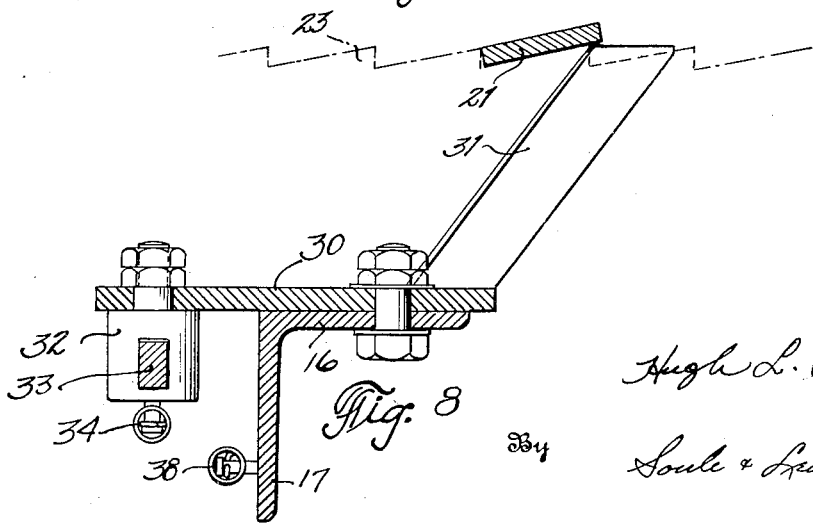

Patented Oct. 10, 1933

1,929,756

UNITED STATES PATENT OFFICE 1,929,756

FRONT END LIFT AND SUPPORT FOR SEMITRAILER VEHICLES

Hugh L. Rogers, Albion, Pa.

Application June 20, 1932. Serial No. 618,124

16 Claims. (Cl. 280—33.1)

This invention relates to a front end lift and support for semi-trailer vehicles and is adapted for lifting or jacking up the forward end of the semi-trailer consequent, in part, upon backing of the trailer vehicle by a tractor vehicle.

One of the objects of the present invention is to provide a lift and supporting device for this purpose which will operate efficiently on irregular road surfaces and which may be disposed in an idle position above the road surface when not in use.

Another important feature of the invention resides in the manner in which the support is secured in operating position so as to insure positive locking of the support in supporting position relative to the semi-trailer vehicle.

Another object is to provide a trigger mechanism for rendering the locking means idle to permit the support being moved to an idle position and for automatically rendering the locking means active consequent upon movement of the support to the idle position so as to insure proper locking engagement at any time that the support is moved toward the road engaging position.

Another important feature of the invention resides in the manner in which the locking and controlling mechanism of the support is mounted onto the trailer vehicle.

A more specific object is to provide a support for the purpose described which is rigid both laterally and longitudinally when in supporting position so as to prevent any twisting of the vehicle and consequent binding of the fifth wheel connection between the vehicle and the tractor.

Another object of the invention is to provide a simple and effective mechanism which may be easily operated for drawing the support into idle position and for securing said support in the idle position.

Still another object is to insure effective engagement of the support with a road surface and to gradually lift the front end of the vehicle by action of the support consequent upon rearward movement of the support in road-engaging position.

Other objects and features of the invention will become apparent from the following specification wherein reference is made to the drawings.

In the drawings, Fig. 1 is a diagrammatic elevation showing a ractor-trailer combination with the support of the present invention in different operating positions;

Fig. 2 is a transverse sectional view taken substantially along the line 2—2 on Fig. 1;

Fig. 3 is an elevation of part of a semi-trailer vehicle with the hoist and support of the present invention installed, parts thereof being shown in section for purposes of clearness of illustration;

Fig. 4 is a view similar to Fig. 3, showing the support and associated parts in carrying position;

Fig. 5 is a sectional view of the invention taken on a plane indicated by the line 5—5 of Fig. 1;

Fig. 6 is a plan view of part of the locking mechanism showing the same in locking position;

Fig. 7 is a view similar to Fig. 5, showing the released position of the locking mechanism, and Fig. 8 is a detail view of a portion of the locking mechanism.

Referring particularly to Fig. 1, the trailer 1 is shown as provided at its front end with a fifth wheel member 2 adapted to engage a complementary fifth wheel member 3 on the tractor 4 for supporting the front end of the trailer in the normal operating position.

The type of semi-trailer illustrated comprises a body supported on longitudinally extending parallel spaced I-beams 5, to which are secured hangers 6, the hangers having transversely aligned openings adapted to receive rock shafts or pivots 7 for pivotally mounting thereon a front end lift and support 8.

The support 8 depends from the pivots 7 for engagement with the road surface and is preferably a transversely and longitudinally rigid frame of sufficient strength to support the front end of the trailer without lateral sway regardless of what lateral portion of its road-engaging surface engages the road surface. At its lower end, the frame is provided with shoes or road contacting surfaces 9 which form with the upright member or legs of the frame a substantially triangular section, as illustrated.

Referring particularly to Fig. 3, the shoe portions 9 are preferably arcuate and provided on the under or road-engaging surfaces with suitable projections 11 so as to insure better engagement between the shoes and the road surface. The forward legs of the frame 8 are shorter than the rearward legs and preferably of such length that a radius from the pivots 7 to the forward ends of the shoes 9 is substantially equal to the height of the pivots above the road surface when the trailer is resting on the road surface in operating engagement with the tractor. Consequently, if the frame is released and swings downwardly, the front end engages the road surface substantially beneath the pivots. The radius through the pivots to the shoes increases from front to rear of the shoes so that as the trailer is backed to roll the same about the shoes 9 from this position, it will be lifted gradually by the frame a distance equal the difference of these radii and thus transfer the weight of the front end of the trailer from the tractor onto the support. By positioning the pivots 7 close to the floor of the trailer, a comparatively long radius of curvature is obtained, and therefore the rate of increase in the radius of curvature from front to rear for lifting the trailer a given distance is much less than were the pivots 7 disposed close to the road surface and, moreover, very efficient lifting is obtained.

Since the distance from the pivots 7 to the front ends of the shoes 9 is substantially equal to the normal operating height of the pivots 7 above the roadway, the forward ends of the shoes will engage the road surface substantially beneath the pivots 7, as mentioned above, thereby insuring that the frame will not kick backwardly and fail to rotate about the pivots as the trailer is moved rearwardly. In some cases, the frame may be free to rotate forwardly of the vehicle about the pivots 7 so as to dispose the rear ends of the shoes 9 slightly forwardly of dead center, that is, forwardly of the vertical plane through the pivot. When so moved, the weight of the trailer tends to rotate the support forwardly beyond this point and against a suitable stop, thus insuring more positive supporting operation. In the present structure, it is preferable to prevent the support from rotating forwardly to or past this dead center position and to lock the support in various rotated positions by the new locking mechanism hereinafter described.

A preferred form of this locking mechanism is illustrated and comprises a carrier 12 to each side of which are pivotally secured, by pivots 13, rigid jack bars 14, respectively. The other ends of the jack bars are pivotally connected to the supporting frame 8, as indicated at 15. The carrier 12 comprises a rigid body which is mounted for sliding movement longitudinally along the flanges of the frame members 5.

Referring particularly to Figs. 5 to 7, the carrier is preferably a body 16, reinforced by a vertically depending flange 17, and extending transversely of the trailer. The body 16 is adapted to lie face-to-face with the underside of the lower flanges of the I-beams 5, the ends of the body extending laterally past the lower outer flanges of the beams 5. Suitable plates, which are indicated at 18, are secured onto the body 16 and spaced thereabove and overhanging the upper faces of the outer flanges of the longitudinal I-beams 5, so as to mount the body 16 on the flanges of the longitudinal beams as a track for sliding movement forwardly and rearwardly of the vehicle.

It is apparent from the arrangement shown that as the support is moved to various rotated positions about the pivots 7, the carrier 12 will move longitudinally of the beams 5. Consequently, in order to lock the support for retaining it in different rotated positions, it is only necessary to lock the carrier in different corresponding positions along the beams 5. For accomplishing this purpose, longitudinally extending ratchet members 20 are secured on the inner lower flanges of the beams 5, the toothed operating faces thereof extending upwardly from said flanges. A dog, which may comprise a transversely extending rigid bar 21, is pivotally mounted on the carrier 12 by transversely extending pivots 22 so as to swing upwardly out of engagement with the teeth of the ratchets 20 or to drop downwardly into engagement therewith. The teeth 23 of the ratchet are positioned so as to permit movement of the dog 21 forwardly therealong and arrest movement of the dog, and consequently the carrier, in the opposite direction. Thus, as the supporting frame moves forwardly about its pivots, the dog 21 is always in operating position relative to the ratchet to arrest any rearward movement. Consequently, if the front end of the trailer is accidentally dropped while the supporting frame is in partially rotated position and before the supporting frame has engaged the road surface and moved to supporting position, a very slight drop only will be effected due to the lock and the fact that the weight of the supporting frame is sufficient to move the carrier forwardly when the supporting frame is released from idle position. At the forward end of the path of travel of the carrier 12, a lug or stop 25 is secured onto the truck. This lug is positioned so as to engage the carrier and arrest further forward movement of the carrier after the fame has been rotated into final supporting position. When the frame is thus moved into this position and the carrier engages the lug 25, the dog 21 is in engagement with the ratchet so that the frame is locked securely against material forward or rearward movement, the dog being held against the ratchet tooth by the rearward shove of the jack bar 14. In this position, the tractor may be disconnected and withdrawn from the trailer and the load will be supported on the supporting frame.

When it is again desired to connect the trailer and tractor, the tractor may be backed into position and the king pin and complementary fifth wheel members engaged in the usual manner. It is then necessary to return the supporting frame to idle position. In order to insure safety in operation, the dog 21 is left engaged by the ratchet until connection between the tractor and trailer is effected. In order to insure continued supporting relation between the frame and the trailer until the fifth wheel members are connected, means are provided to trip the dog 21 out of engagement with the teeth 23 of the ratchet consequent upon slight rearward movement of the trailer by the tractor. In order to insure engagement of the fifth wheel member and king pin in the commonly used types of fifth wheels, it is necessary to back the tractor so as to carry the fifth wheel member and king pin into engagement sufficiently hard to cause slight rearward movement of the trailer by the tractor. This insures latching the fifth wheel king pin in operating position. Consequently, if it were necessary to effect this rearward movement of the trailer to disengage the dog 21 from the ratchet 20, the connection between the tractor and trailer would be assured before the supporting frame were released so that it would no longer support the trailer. In order to render disengagement of the dog and ratchet dependent upon this slight rearward movement, a trigger mechanism is provided.

This trigger mechanism may comprise a plate 30, pivotally secured on the body 16 of the carrier 12. Carried on the plate 30 is a cam lever arm or trigger 31 which is adapted to engage the dog 21 as the plate 30 is rotated about its pivot. The lever 31 engages the underside of the dog 21 and lifts it clear of the ratchet teeth, as illustrated in Fig. 7, when in one rotated position. Secured on the plate 30 is a swivelled boss 32 which is provided with an opening in which a rod 33 is loosely engaged so as to slide transversely of the trailer. A spring 34 is secured at one end to the boss 32 and at the other end to the rod 33, the spring normally tending to draw the rod inwardly of the carrier 12 through the passage in the boss 32. Secured to the outer end of the rod is a handle 35 for drawing the rod axially outwardly of the carrier 12 so as to tension the spring 34. A locking shoulder 36 is provided on the rod 33 and is adapted to engage the outer surface of the lug 37 on the carrier 12 for locking the rod in the withdrawn position. An additional spring 38 is secured at one end to the rod 33, the other end being secured to the flange 17 of the frame of the carrier. This spring is also tensioned consequent upon withdrawing the rod to the position illustrated in Fig. 5. When the rod is so withdrawn and locked in position by engagement with the shoulder 36, both springs are tensioned and the spring 34 is pulling on the swivelled boss 32 in a direction to rotate the plate 30 to move the lever 31 from right to left, that is, from idle position, indicated by the dot-dash lines 31a in Figs. 5 and 6 to an active position, designated by dot-dash line 31b in Fig. 6, in which latter position, it lifts the dog 21 clear of the ratchet. Due to the pressure exerted against the face of the dog 21 by engagement with the vertical face of the tooth of the ratchet with which it is associated while the carrier is urged rearwardly due to the weight tending to rotate the support in that direction, the spring is not sufficient to operate the lever 31 to force the dog clear of the teeth, but only to the position illustrated in Figs. 5 and 6. However, upon slight rearward movement of the trailer with the supporting frame in engagement with the ground, this pressure is relieved and the dog is left resting by its own weight between the teeth of the ratchet. With the pressure so relieved, the spring 34 contracts to its normal position, thus throwing the lever 31 to the left and lifting the dog 21 clear of the ratchet, as illustrated in Fig. 7. In this position, the frame may be rotated rearwardly to idle position and against the lower face of the I-beams 5.

For rotating the frame to this idle position, a manually operable hoist is provided. This hoist may comprise a shaft 40, rotatably mounted in the beams 5 and extending transversely of the vehicle, a hand wheel 41 being rigidly secured on the shaft 40 for rotating the same. Secured at one of its ends to the shaft is a flexible cable 42, the other end of the cable being fastened to the supporting frame 8, preferably to a forward cross member thereof, as indicated at 43, so that the shaft may be rotated to wind up the cable and pull the supporting frame firmly against the underside of the beams 5. A suitable ratchet wheel 44 is secured on the shaft 40 and a complementary dog 45 is provided on one of the beams 5 for locking engagement with the ratchet so as to hold the frame in the hoisted position.

Assuming the dog 21 has been released from and held out of engagement with the teeth of the ratchet 20 through the medium of the lever 31 as described, for permitting movement of the support to idle position, it will now be seen that if the operator of the truck should then release the ratchet 44 and the frame and back the tractor so as to dispose the frame in supporting position, and should inadvertently fail to release the trigger mechanism, the ratchet 20 and dog 21 would still be inoperative, so that the frame would not be locked against rearward movement. In order to guard against this possibility, means are provided to return the trigger to idle position when the supporting frame has been rotated substantially to its idle position, so that when the frame is again dropped and released to lift and support the trailer, the dog will be operative. To accomplish this purpose, a cam 50 is rigidly secured on the trailer. The cam surface of the cam 50 slopes upwardly rearwardly of the trailer and is in a position to engage the handle 35 of the rod 33 when the carrier is moved to a predetermined position rearwardly of the trailer. The cam 50 lifts the handle 35 when the carrier is moved rearwardly, thus disengaging the shoulders 36 and 37. Upon disengagement of these shoulders, the spring 38 which has been tensioned as described, draws the rod 33 inwardly to its starting position. Secured on the rod 33 is a lug 51 which is positioned longitudinally of the rod so as to effect a lost motion engagement with the swivelled boss 32 of the trigger. Consequently, when the spring 38 draws the rod inwardly, the lug 51 on the rod engages the swivel boss 32 and returns the cam lever or trigger 31 to idle position. In this position, the dog 21 is automatically released for engagement with the ratchet 20 so that upon movement of the supporting frame forwardly toward supporting position, operative engagement of the dog 21 and the ratchet 20 is insured. A post 52 is provided in the body 16 of the carrier to prevent the dog 21 from being kicked by the trigger mechanism to the opposite side of its pivot, thus insuring that the dog will at all times be ready for engagement with the ratchet during any operating position of the supporting frame, except when the operator is hoisting the frame through the medium of the cable 42 into idle position.

It is apparent, therefore, that the present invention insures positive engagement of the support with the road surface for efficiently hoisting the vehicle and transferring the load to the support and also positive locking of the support in various operating and idle positions. Furthermore, the releasing of the locking mechanism, so as to render it ready for automatic operation, is also automatic, thus precluding the operator from operating the mechanism in a manner which can cause improper functioning.

Having thus described my invention, I claim:

1. In a tractor and semi-trailer vehicle combination, a front end lift and support for the semitrailer vehicle, comprising a transversely and longitudinally rigid frame pivotally connected to said vehicle by a transversely extending pivot means, said frame depending from said pivot means and having a rigid longitudinally extending road-engaging surface, a radius from said pivot to the forward part of said surface being such that the part of said surface forwardly of the semi-trailer vehicle engages the roadway substantially directly beneath the pivot means when the trailer vehicle is resting on said roadway in normal operating position relative to the tractor, said radius increasing from the forward part of said road engaging surface rearwardly thereof, whereby upon backing the vehicle with the forward part of said surface in contact with the roadway, said frame is rotated about said pivot and engages the roadway progressively from front to rear of said supporting surface and lifts said pivot for transferring the load from the tractor onto said frame, means to latch said frame in supporting position, means for rotating said frame about said pivot to an idle position above and out of contact with the roadway, and means for latching said frame in said idle position.

2. In a tractor and semi-trailer vehicle combination, a lift and support for the semi-trailer vehicle, comprising a transversely and longitudinally rigid frame secured at its upper end to the vehicle by a transversely extending pivot means and depending from said pivot means for engagement with a roadway, a curvilinear road-engaging surface on said frame extending longitudinally of the vehicle, the radius from said pivot means to the forward part of said surface being such that the forward part of said surface engages the roadway substantially beneath the pivot when the vehicle is resting on the roadway in normal operating position relative to said tractor, radius of curvature from said pivot means to said surface increasing progressively rearwardly from said forward part of said surface whereby upon rearward movement of the vehicle, the frame is rotated relatively to the vehicle and the vehicle is lifted thereby, latch means to latch the frame in predetermined rotated positions, said means being operable consequent upon rotation of said frame to said positions, means to render said latch means idle, and means to rotate said frame to an idle position and to latch the frame in said position.

3. In a tractor and semi-trailer vehicle combination, a front end support for the semi-trailer vehicle, comprising a supporting member pivotally secured to the vehicle by a transversely extending pivot and depending therefrom for engagement with the road surface while the vehicle is resting on said surface in operative relation to the tractor, said support being rotatable in one direction about said pivot consequent upon rearward movement of said vehicle during engagement of the supporting member and road surface and operating when so rotated for transferring the weight of the vehicle from the tractor onto said supporting member, and latch means operable consequent upon movement of said supporting member toward its supporting position to block the return of said member in the opposite direction, at a plurality of active positions of said supporting member, means for rendering said latch means idle whereby the support may be moved to idle position, and means to hold the support in idle position.

4. In a tractor and semi-trailer vehicle combination, a front end lift and support for the semi-trailer vehicle, comprising a supporting member secured to the vehicle and depending therefrom for engagement with the road surface, said supporting member being operable consequent upon rearward movement of the vehicle to lift and support the front of said vehicle, dog and ratchet latch means connected to said supporting member and to the vehicle and operable consequent upon movement of said support toward supporting position to block the return of said support in the opposite direction, and a trigger operably engageable with said latch means for rendering said latch means selectively operable and idle, and additional means connected to said support for moving said support to idle position and locking the said support in idle position when the dog and ratchet latch means is idle.

5. In a tractor and semi-trailer vehicle combination, a front end lift and support for the semi-trailer vehicle, comprising a supporting member secured to the vehicle by a transverse pivot and depending therefrom for engagement with the road surface, said supporting member being operable to engage the road surface and to support the front of said vehicle when active, latch means operable consequent upon movement of said support toward supporting position to block the return of said support in the opposite direction, a trigger adapted to render the latch means idle when the trigger is moved to active position, a settable trigger operating means for yieldably urging the trigger toward said active position and into stressed engagement with said latch means while the latch means is seated for holding said support in supporting position, said trigger operating means being rendered operable consequent upon slight movement of said support toward active position to move the trigger to position for completely unseating said latch means and render the same idle, and means to hold the support in idle position.

6. In a tractor and semi-trailer vehicle combination, a front end support for the semi-trailer vehicle, comprising a supporting member secured to the vehicle and depending therefrom for engagement with the road surface, said supporting member being operable to support the front end of said vehicle on the road surface when active, latch means operable consequent upon movement of said support toward supporting position to block the return of said support in the opposite direction, a trigger for releasing said latch means and holding said latch means in idle position when the trigger is set in active position, spring means for moving said trigger from idle to active position consequent upon stressing said spring means, means for stressing said spring means and retaining the spring means in stressed condition, means operable consequent upon movement of said support to a non-supporting position to release said stressing means, and means operable consequent upon releasing of said stressing means to return the trigger to idle position, and means for latching the support in idle position.

7. In a tractor and semi-trailer vehicle combination, a front end support for the semi-trailer vehicle, comprising a supporting member secured to said vehicle and depending therefrom for engagement with a road surface while the vehicle is resting thereon in operative relation to the tractor, said support being movable relatively forwardly of the vehicle for supporting the front end of said vehicle, a ratchet carried on said vehicle, a dog engageable therewith and operably connected to said support for movement thereby, said dog and ratchet disengaging when the support is moved forwardly of the vehicle and engaging consequent upon rearward movement of said support to arrest such rearward movement, a settable trigger, said trigger disengaging said dog and ratchet when active, means to latch said trigger in active position, means to release said trigger latching means consequent upon rearward movement of said support a predetermined distance toward idle non-supporting position to render the trigger idle, thereby releasing said dog for rendering the same active and means for latching the support in idle position.

8. In a tractor and semi-trailer vehicle combination, a front end support for the semi-trailer vehicle, comprising a supporting member secured to said vehicle and depending therefrom for engagement with a road surface while the vehicle is resting thereon in operative relation to the tractor, said support being movable relatively forwardly of the vehicle for supporting the front end of said vehicle, a ratchet carried on said frame, a dog engageable therewith and operably connected to said support for movement thereby, said dog and ratchet disengaging when the support is moved forwardly of the vehicle and engaging consequent upon rearward movement of said support to arrest such rearward movement, a settable trigger, said trigger disengaging said dog from said ratchet when active, means to latch said trigger in active position, means to release said trigger latching means consequent upon rearward movement of said support a predetermined distance toward idle non-supporting position to render the trigger idle thereby releasing said dog for rendering the same active, and means for maintaining said dog disengaged while the support is moved to idle position and means to latch the supports in idle position.

9. In a tractor and semi-trailer vehicle combination, a front end support for said trailer vehicle, comprising a support pivotally connected to the vehicle and depending therefrom for engagement with the road surface, said support being adapted to engage the ground and support the front end of said vehicle when said support is in active condition, a track on said vehicle extending longitudinally thereof, a carrier movable longitudinally on said track, a rigid bar connecting said carrier and said support and pivotally secured to said members at its ends, a latching element carried on said vehicle frame, a cooperating latching element carried on said carrier, said elements when active operating to block rearward movement of said carrier while permitting free forward movement thereof, whereby said support is latched against rearward movement, restraining means carried by said carrier for rendering the latching means idle when the restraining means is active, means operable consequent upon movement of the carrier along a predetermined position along said track for releasing said restraining means and means for holding the support in idle position.

10. A semi-trailer having spaced parallel longitudinally extending floor supporting beams, a front end support for said trailer, said support being secured to said trailer and movable relatively longitudinally thereof and operating when so moved to lift the front end of the tractor, means to latch said support in supporting position, said means including a carrier, a rigid strut pivotally connected at one end to said carried and at the other end to said support, said carrier being slidably secured to said frame members and slidable therealong consequent upon movement of said support to different positions, latch means on said trailer and on said carrier, said means cooperating consequent upon movement of said carrier to a predetermined position for latching said carrier in said position.

11. In a tractor and semi-trailer vehicle combination, a front end support for the semi-trailer vehicle, comprising a rigid supporting member carried by the vehicle and depending therefrom for engagement with the road surface, said support having a road-engaging surface movable forwardly and rearwardly relative to said vehicle consequent upon movement of said vehicle while said surface engages the road surface, said supporting surface operating when moved in one direction relative to said vehicle to elevate said vehicle and transfer part of the load from the tractor onto said support, latch means for blocking return of said support in the opposite direction as the support is moving from idle into supporting position, settable means for retaining the latch means in idle position, whereby the support may be returned to its idle position, and spring actuated means operable consequent upon rearward movement of said support to a given position to render the settable means idle and means for latching said support in idle position.

12. In a semi-trailer vehicle, having a front end support of the character described, a latch means for blocking the return of said support toward a non-supporting position as the support is moved toward supporting position, a spring actuated trigger engaging said latching means for rendering said latching means idle when the trigger is active, a lever to stress said spring and latch said spring in stressed condition for operating said trigger, a spring for returning said lever to starting position consequent upon release of said lever, and means operable consequent upon operation of the last mentioned spring for rendering said trigger idle, and means for latching the support in idle position.

13. In a semi-trailer vehicle, a front end support for the semi-trailer, comprising a supporting member secured to the vehicle by a transversely extending pivot means and depending therefrom for engagement with the road surface when in active position, said support being rotatable forwardly and rearwardly about said pivot to active and idle positions, a longitudinally extending ratchet on said vehicle, a dog operably connected to said support and movable forwardly and rearwardly thereby and operably engageable with said ratchet for locking said support against movement toward idle position after the support has been moved a predetermined distance from idle toward active position, trigger means for lifting the dog clear of the ratchet when the trigger means is active, means having a guiding surface extending rearwardly from said ratchet beneath the dog for supporting said dog in position to pass into operative relation to the ratchet when the dog is moved forwardly, means operable consequent upon movement of the dog rearwardly past the ratchet for rendering said trigger means idle whereby the dog drops onto and rests upon said guiding surface and may pass into said operable engagement with the ratchet when moved forwardly by said support, and means for latching said support in idle position while the dog and ratchet are disengaged.

14. In a semi-trailer vehicle, a front end support for the semi-trailer comprising a supporting member secured to the vehicle by a transversely extending pivot means and depending therefrom for engagement with the road surface when in active position, said support being rotatable forwardly and rearwardly about said pivot and engaging the road surface in one position, latch means movable to active position consequent upon movement of the support toward active position for blocking the return of said support toward idle position, trigger means for rendering said latch means idle when the trigger means is active, a trigger setting device for moving said trigger means to active and idle positions and for holding the trigger means in active position, means engageable with said trigger setting device consequent upon movement of said support a predetermined distance toward its idle position to release the trigger setting device and render the trigger idle, guide means to retain the latching means in idle position during additional movement of the said support towards idle position and for guiding said latching means into latching position consequent upon movement of said support a predetermined distance toward active position, additional means to move said support rearwardly and to lock the same in idle position.

15. In a semi-trailer vehicle having a front end support of the character described, a latch means for blocking the return of said support from a supporting to a non-supporting position, a trigger engageable with said latch means when the support is in a supporting position for rendering said latch means idle when the trigger is active, trigger operating means for yieldably urging said trigger into active position when the trigger operating means is active, trigger latch means for latching said trigger operating means in active position, means for returning the said trigger operating means to starting position consequent upon release thereof by said trigger latching means, means operable consequent upon return of said trigger operating means toward its starting position for rendering said trigger idle, and means operable consequent upon movement of said support a predetermined distance toward idle position of said support for releasing said trigger latching means.

16. In a semi-trailer vehicle having a front end support of the character described, a latch means for blocking the return of said support from a supporting to a non-supporting position, a trigger engageable when active with said latch means for rendering said latch means idle, means to move the trigger into active position, trigger latch means for latching said trigger in active position, means for returning the said trigger to idle position when said trigger latching means is released, and means operable consequent upon movement of said support a predetermined distance toward idle position of said support for releasing said trigger latching means.

HUGH L. ROGERS.